(12) United States Patent
Mohajeri et al.

(10) Patent No.: US 7,578,992 B2
(45) Date of Patent: Aug. 25, 2009

(54) CATALYTIC DEHYDROGENATION OF AMINE BORANE COMPLEXES

(75) Inventors: Nahid Mohajeri, Rockledge, FL (US); Ali Tabatabaie-Raissi, Melbourne, FL (US); Gary Bokerman, Rapid City, MI (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 11/864,371

(22) Filed: Sep. 28, 2007

(65) Prior Publication Data

US 2008/0159949 A1   Jul. 3, 2008

Related U.S. Application Data

(62) Division of application No. 11/414,572, filed on Apr. 28, 2006, now Pat. No. 7,285,142.

(51) Int. Cl.
*C01B 3/02* (2006.01)
(52) U.S. Cl. .................................. 423/648.1
(58) Field of Classification Search ............... 423/648.1
See application file for complete search history.

(56) References Cited

U.S. PATENT DOCUMENTS

| | | | |
|---|---|---|---|
| 4,157,927 | A | 6/1979 | Chew et al. |
| 4,381,206 | A | 4/1983 | Grant |
| 4,468,263 | A | 8/1984 | Artz et al. |
| 6,676,919 | B1 | 1/2004 | Fischer et al. |
| 2004/0037770 | A1 | 2/2004 | Fischer et al. |
| 2005/0031507 | A1* | 2/2005 | Mae et al. .................... 422/222 |
| 2005/0180916 | A1 | 8/2005 | Autrey et al. |
| 2005/0266281 | A1 | 12/2005 | Adams et al. |
| 2006/0292068 | A1* | 12/2006 | Stephens et al. ......... 423/648.1 |

FOREIGN PATENT DOCUMENTS

| | | |
|---|---|---|
| JP | 200506792 | 3/2005 |
| WO | WO 01/01199 | 1/2001 |
| WO | WO 02/28528 | 4/2002 |

OTHER PUBLICATIONS

Chandra et al. "A high-performance hydrogen generation system: Transition metal-catalyzed dissociation and hydrolysis of amonia-borane", Journal of Power Sources, 156, (2006) pp. 190-194.

* cited by examiner

*Primary Examiner*—Wayne Langel
(74) *Attorney, Agent, or Firm*—Patents On Demand, P.A.; Neil R. Jetter

(57) ABSTRACT

A method of generating hydrogen includes the steps of providing an amine borane (AB) complex, at least one hydrogen generation catalyst, and a solvent, and mixing these components Hydrogen is generated. The hydrogen produced is high purity hydrogen suitable for PEM fuel cells. A hydrolytic in-situ hydrogen generator includes a first compartment that contains an amine borane (AB) complex, a second container including at least one hydrogen generation catalyst, wherein the first or second compartment includes water or other hydroxyl group containing solvent. A connecting network permits mixing contents in the first compartment with contents in the second compartment, wherein high purity hydrogen is generated upon mixing. At least one flow controller is provided for controlling a flow rate of the catalyst or AB complex.

20 Claims, 8 Drawing Sheets

Reaction order with respect to catalyst

0.010M @30oC

CATALYTIC DEHYDROGENATION OF AMINE BORANE COMPLEXES

CROSS-REFERENCE TO RELATED APPLICATIONS

This application is a divisional of U.S. patent application Ser. No. 11/414,572, filed on Apr. 28, 2006, entitled "CATALYTIC DEHYDROGENATION OF AMINE BORANE COMPLEXES" which is incorporated herein by reference.

STATEMENT REGARDING FEDERALLY SPONSORED RESEARCH OR DEVELOPMENT

The U.S. Government may have certain rights to the invention based on NASA Grant No. NAG3-2751.

FIELD OF THE INVENTION

The invention relates to hydrogen generation systems, more specifically to catalyzed amine borane (AB) complex-based hydrogen generation methods and related systems.

BACKGROUND OF THE INVENTION

Hydrogen has been endorsed by numerous world leaders and decision makers in both public and private sectors and hailed as the key to a clean energy future. Many believe that the future alternative to current fossil-based economy will involve hydrogen—used as the primary energy carrier in all energy sectors. In that regard, hydrogen will be utilized much like electricity that is presently the defacto energy carrier in much of the world.

Hydrogen and electricity are complementary energy carriers and together they can create an integrated energy system based on distributed power generation and use. Hydrogen and electricity are interchangeable using a fuel cell (to convert hydrogen to electricity) or an electrolyzer (for converting electricity to hydrogen). A regenerative fuel cell works either way, converting hydrogen to electricity and vice versa.

The advantages of using fuel cells for power generation include: 1) ability to convert fuel into electricity directly; and 2) being an electrochemical device, they are more efficient than the Carnot cycle based energy conversion devices such as internal combustion engines (ICE).

As noted above, hydrogen can be used in fuel cells to power electric motors. Furthermore, hydrogen, in combination with proton exchange membrane fuel cells (PEMFC), can replace rechargeable batteries as the power source of choice in certain applications, such as military and other applications requiring portable power.

Presently, rechargeable power sources are used for cell phones, PDAs, and laptop computers, among others. However, the majority of military applications, particularly those involving soldier-portable devices still utilize standard, non-rechargeable primary batteries. The reason for this is that primary batteries offer long shelf life, robustness, and ease-of-use.

Secondary (rechargeable) batteries have improved over the years, but an alkaline primary battery still delivers 50% more power than lithium-ion, one of the highest energy density secondary batteries in existence. The primary lithium battery used in cameras provides more than three times the energy of a secondary lithium-ion battery of same size. Moreover, rechargeable batteries are vulnerable to the elements as well as extreme temperatures, humidity, salt, and other exposure. While recent innovations in the technologies used in rechargeable batteries has reduced these risks, rechargeable batteries are not yet as powerful, rugged or reliable as primary batteries.

Despite their dependability and superior capacity, the one-time use constraint of primary batteries increases their cost to over thirty times that of rechargeable batteries (mainly because new batteries are constantly required to be replaced). Moreover, the logistics of getting new batteries delivered to military field units can be challenging or even impossible. Soldiers are often required to carry up to 30 lbs of batteries in the field to power their electronic gear. Rechargeable batteries would obviously be a much lighter alternative, but their limitations due to exposure make them too risky for many defense applications, even though they are still used in military training exercises.

Compounds represented by the empirical formula $B_xN_xH_y$ have been known and used as high capacity hydrogen carriers. Generation systems based on such carriers can provide hydrogen storage for hydrogen on-demand applications. However, the hydrogen is often too impure for important applications, the process yield is low, the process requires a high temperature (e.g. greater than 100° C.) for reasonable yield, and/or environmentally harmful materials are required.

For example, U.S. Pat. No. 4,157,927 to Chew et al. discloses amine boranes and their derivatives mixed with heat producing compounds such as lithium aluminum hydride or a mixture, such as $NaBH_4/Fe_2O_3$ as hydrogen generating formulations. The mixed powder is then pressed into pellets and ignited to generate hydrogen or deuterium. The formulations disclosed do not produce the ultra high purity hydrogen gas required by PEMFC and other demanding applications.

U.S. Pat. No. 4,381,206 to Grant et al. discloses an amine borane gas generating system comprising hydrazine bis-borane or its deuterated derivatives in the form of a pellet, which serves as the thermal initiator for further thermal decomposition. An all amine borane gas generator system which consists of $N_2H_42BH_3$ and $H_2B(NH_3)_2BH_4$ provides hydrogen from a self-sustaining reaction after the self-sustaining reaction is initiated by a heat source such as a nichrome wire. Again, formulations disclosed by Grant do not produce the ultra high purity hydrogen gas required for the PEMFC applications.

Ammonia borane (AB) complex has the highest hydrogen content (about 19.6 wt %)—highest amongst all amine boranes with a system-level $H_2$ energy storage density of about 2.74kWh/L vs. 2.36 kWh/L for liquid hydrogen. At near room temperatures and atmospheric pressure, AB is a white crystalline solid, and is stable in both water and ambient air.

Thermolysis has been used as a method of choice to generate hydrogen from AB complexes. The drawbacks of thermolysis for hydrogen release are as follows: Ammonia borane pyrolysis begins at temperatures below 140° C. To release substantially all of the hydrogen contained in ammonia borane complex, however, temperatures above 500° C. are required. The overall process is exothermic, but requires heat to be added to activate the AB complex. The overall thermolytic reaction can be written as follows:

$$NH_3BH_3 + Heat \rightarrow BN + 3H_2$$

In practice, thermolysis of AB complex involves competing reactions leading to the formation of certain undesirable by-products. For example, FTIR analysis of the evolved gases from the thermolysis of AB complex has shown that monomeric aminoborane ($BH_2NH_2$), borazine, and diborane is also produced. The aminoborane comprises poly-(aminoborane), $(BH_2NH_2)_n$.

Poly-(aminoborane), the inorganic analog of polyethylene, is a nonvolatile white solid. Volatile compounds are undesirable impurities that make hydrogen from direct thermolysis of AB complex unfit for PEMFC applications. Furthermore, formation of these undesirable compounds lowers the yield of $H_2$ from direct thermolysis of AB complex.

Because direct high temperature thermolysis of amine borane complexes, in general, and AB complex, in particular, generates low yield of inferior quality hydrogen contaminated with volatile pyrolysis products, it is highly desirable to find new energetically self-sufficient processes that can generate ultra high purity $H_2$ at low, near ambient temperatures.

Hydrolytic or methanolic cleavage of amine borane complexes provides 3 moles of hydrogen per mole of AB complex. Although this process has been used in the field of modern synthetic organic chemistry and for pharmaceutical applications, only recently has it been applied as a way of utilizing AB complex for the storage of $H_2$:

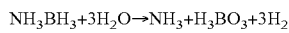

$NH_3BH_3+3H_2O\rightarrow NH_3+H_3BO_3+3H_2$

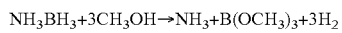

$NH_3BH_3+3CH_3OH\rightarrow NH_3+B(OCH_3)_3+3H_2$

As mentioned above, AB complex is a stable adduct. Therefore, the above hydrogen generating reactions have involved harsh acidic condition (e.g. refluxing in aqueous HCl) or the use of heterogeneous catalysts based on palladium or nickel.

Using methanol as a reagent, such as in the reaction above, has a major drawback as it increases the overall weight of the AB-based hydrogen generator, thus reducing the overall specific $H_2$ energy storage density of the hydrogen generator.

Published U.S. Application No. 20050180916 to Autrey et al. discloses ammonia borane deposited onto a support or scaffolding material at a 1:1 weight ratio. Supports are porous materials such as mesoporous silica. Autrey also discloses a transition metal catalyst and a carbon support. This material exhibits hydrogen release rate that is about one order of magnitude greater than that from the neat compound. In addition, the disclosed temperature for hydrogen release is reduced to about 85° C.

Thus, all known methods for low temperature hydrogen release from an AB complex and related materials have significant shortcomings. Thermolytic dehydrogenation requires a relatively high temperature and generates a significant concentration of by-product impurities which make this process unfit for certain important applications. Although Autrey et al. discloses dehydrogenation of AB complex at about 85° C., a special or complicated support structure is required and no more than two moles of hydrogen are generated. Hydrolytic or related cleavage processes require harsh chemicals, such as HCl in reflux temperatures. Therefore what is needed is an energetically, self-sustaining method and apparatus for hydrolytic and/or thermolytic dehydrogenation of amine borane complexes, in a hydrogen generator for portable, on-board and off-board power generation via PEMFC and ICE.

SUMMARY

A method of generating hydrogen comprises the steps of providing an amine borane (AB) complex, at least one hydrogen generation catalyst, and a solvent, and mixing these components. The hydrogen produced by the mixing step exclusive of any separation processing is generally "high purity hydrogen gas". As used herein, "high purity $H_2$ gas" refers to a gas containing 99% by volume hydrogen, preferably a gas containing 99.9% by volume $H_2$, more preferably a gas containing 99.99% by volume $H_2$ (or higher).

The hydrogen generation catalyst can be selected from cobalt complexes, noble metal complexes and metallocenes. For example, the noble metal complex can be selected from $Na_3RhCl_6$, $(NH_4)_2RuCl_6$, $K_2PtCl_6$, $(NH_4)_2PtCl_6$, $Na_2PtCl_6$ and $H_2PtCl_6$.

In one embodiment, the amine borane complex can be $NH_3BH_3$. The method is generally performed in a temperature range of between 25° C. and 80° C.

The solvent can comprise a hydroxyl group comprising solvent which participates as a reactant in generating hydrogen. This embodiment is referred to as hydrolytic dehydrogenation. For example, the hydroxyl group comprising solvent can be water or methanol. In this embodiment the amine component of the AB complex can be an organic amine. The hydrolytic method can include the step of adding an amine-sequestering agent, such as polyacidic acids selected from malic, malonic, oxalic, chromic, phosphoric, pyrophosphoric and sulfuric.

The solvent comprises a coordinating solvent. This embodiment is referred to as thermolytic dehydrogenation. The coordinating solvent can be selected from mono, di, tri, and tetraglyme, tetrahydrofuran, dimethylformamide, 1-Methyl-2-Pyrrolidinone, crown ethers and ethylenediamine. In the thermolytic embodiment, the catalyst can comprises a salt, such as the salt of a weak base and strong acid, or ammonium halide salts, such as $NH_4I$, $NH_4Br$ or $NH_4Cl$, plus those described for hydrolysis.

A hydrolytic in-situ hydrogen generator comprises a first compartment that contains an amine borane (AB) complex, a second container containing at least one hydrogen generation catalyst, wherein the first or second compartment includes water or other hydroxyl group containing solvent. A connecting network is provided for mixing contents in the first compartment with contents in the second compartment, wherein hydrogen is generated. At least one flow controller controls a flow rate of the catalyst or AB complex. In one embodiment the first compartment contains dry AB complex, and said second compartment contains the catalyst and water. In another embodiment, the first compartment contains the AB complex in water, and the second compartment contains the catalyst.

A Proton Exchange Membrane Fuel Cell (PEMFC) based electrical generator comprises an ion-exchange membrane interposed between an anode and a cathode to form a membrane/electrode assembly (MEA), the MEA being interposed between a fuel gas diffusion layer and an oxidant gas diffusion layer. An oxidant flow network is in fluid connection with gas diffusion layer, the oxidant network having an input portion for supplying oxidant, and a fuel flow network fluid in fluid connection with the fuel gas diffusion layer. The fuel network has an input portion for supplying fuel, wherein the fuel flow network is fluidly connected to a hydrolytic in-situ hydrogen generator. The generator comprises a first compartment that contains an amine borane (AB) complex, a second container containing at least one hydrogen generation catalyst, wherein the first or said second compartment includes water or other hydroxyl group containing solvent. A connecting network is provided for mixing contents in the first compartment with contents in the second compartment, wherein hydrogen is generated upon mixing. At least one flow controller controls a flow rate of the catalyst or AB complex.

In one embodiment, the generator further comprises a heat exchanger. The heat exchanger is thermally coupled to the fuel cell and the hydrogen generator, wherein the heat exchanger receives heat generated by the fuel cell and transfers heat to the hydrogen generator. The heat transferred is generally sufficient to avoid the need for an auxiliary heating device for the hydrogen generator. The hydrogen produced by the hydrogen generator is generally high purity hydrogen gas. The hydrogen generation catalyst can be selected from cobalt complexes, noble metal complexes and metallocenes. The noble metal complex can be $Na_3RhCl_6$, $(NH_4)_2RuCl_6$, $K_2PtCl_6$, $(NH_4)_2PtCl_6$, $Na_2PtCl_6$ or $H_2PtCl_6$.

BRIEF DESCRIPTION OF THE DRAWINGS

There is shown in the drawings embodiments, which are presently preferred, it being understood, however, that the invention can be embodied in other forms without departing from the spirit or essential attributes thereof.

FIG. 8 shows the reaction order with respect to the catalyst. FIG. 9 shows the initial rate of AB hydrolysis using 10 mmol $K_2Cl_6Pt$ catalyst at 30° C.: $v_o=k[Cat]^{1.4}[AB]$, where, [Cat] and [AB] denote the concentration of the catalyst and AB complex, respectively.

DETAILED DESCRIPTION

Figure 1:
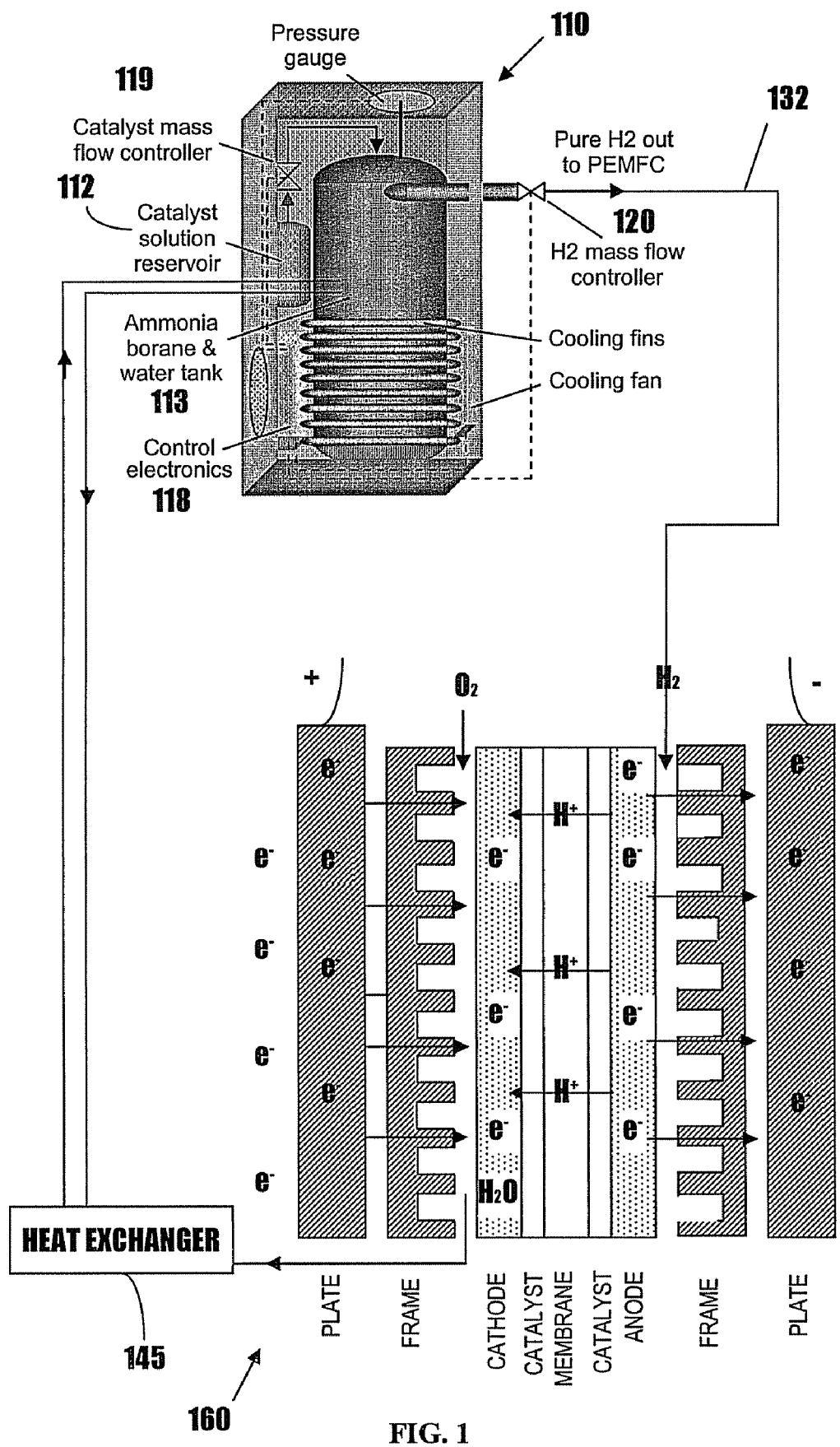
FIG. 1 is the schematic of an exemplary electrical power source comprising a hydrogen generator according to the invention coupled to a PEM fuel cell.

A method of generating hydrogen comprising the steps of providing an amine borane (AB) complex, at least one hydrogen generation catalyst, and a solvent, and mixing the AB complex, the catalyst and the solvent, wherein $H_2$ is generated by the reaction. The reaction can proceed at comparatively low temperatures, such as 50-80° C., and yield in excess of two moles of hydrogen. The catalytic dehydrogenation can proceed via a hydrolytic or thermolytic route. In the case of thermolytic dehydrogenation, no strong acids are required. As used herein, hydrolytic dehydrogenation refers to a process which includes a hydroxyl group comprising reagent, such as, but not limited to, water or methanol. For both hydrolytic or thermolytic dehydrogenation according to the invention no special or complicated support structures are required.

The hydrogen generated is high purity $H_2$ gas, suitable for demanding applications such as PEMFC. As noted above, an issue with the direct pyrolytic dehydrogenation of AB complex based on related work is co-production of undesirable compounds such as borazine, monomeric aminoborane, and diborane that are known to adversely affect performance of the proton PEMFC.

Although generally described herein related to PEMFCs, other fuel cell types can also utilize hydrogen generated according to the invention. Such fuel cells include alkaline fuel cells, phosphoric acid fuel cells, molten carbonate fuel cells, and solid oxide fuel cells.

The AB complex can comprise a variety of amine borane (AB) complexes. For hydrolytic dehydrogenation, (AB) complexes having an organic amine component, such as borane dimethylamine, borane morpholine, and borane tert-butylamine have been found to be effective for generating hydrogen. Ammonia borane ($NH_3BH_3$) can be used for both hydrolytic and thermolytic dehydrogenation according to the invention. In a preferred embodiment, the AB complex is ammonia borane ($NH_3BH_3$), referred to by some as ammonia-borane complex and others as borane-ammonia complex. As noted above, ammoniaborane complex is the simplest of amine borane complexes and is a crystalline solid that contains 19.6-wt % hydrogen.

As used herein, a "hydrogen generation catalyst" is any material that increases the rate of hydrogen release from the AB complex in the presence of the particular solvent(s) at the particular temperature of operation. Suitable catalysts generally include transition metal complexes including Co complexes, noble metal complexes and metallocenes. Regarding noble metal comprising catalysts, exemplary catalysts are generally based on the platinum group metals (PGM), comprising iridium, osmium, palladium, platinum, rhodium, and ruthenium. Such catalysts include $Na_3RhCl_6$, Chlorotris (triphenylphosphine)rhodium (I), $(NH_4)_2RuCl_6K_2PtCl_6$, $(NH_4)_2PtCl_6$, $Na_2PtCl_6$, and $H_2PtCl_6$. Metallocenes can include $Fe(C_5H_5)_2$ (ferrocene) and di-μ-chlorobis(p-cymene) chlororuthenium (II). Exemplary transition metal complexes including Co can include $K_3Co(CN)_6$, and $Co(NH_3)_6Cl_3$. In the case of thermolytic dehydrogenation, the hydrogen generation catalysts can also comprise salts, including salts with weak base and strong acid characteristics, such as ammonium halide salts, including $NH_4I$, $NH_4Br$, and $NH_4Cl$.

For hydrolytic dehydrogenation the solvent can be a hydroxyl group containing compound, such as water or methanol. For thermolytic dehydrogenation the solvent is preferably a coordinating solvent with chelating effects, selected from the group consisting of mono, di, tri, and tetra-glyme, tetrahydrofuran, dimethylformamide, 1-methyl-2-pyrrolidinone, crown ethers and ethylenediamine.

Regarding the thermolytic dehydrogenation of ammonia borane, the Inventors have found that if the ammonia borane is simply heated at 70° C. for even several days, no detectable hydrogen gas is released. If a non-coordinating solvent such as iso-octane is added, 0.7 moles of $H_2$ per mole of AB complex are generated in a period of one day. If a weakly coordinating solvent, such as 2-methoxyethyl ether is used, two moles of $H_2$ is released per mole of AB complex reacted in a period of approximately one day. However, if this same solvent is combined with selected catalysts according to the invention, such as $NH_4I$, 2.3 moles of $H_2$ is released per mole of AB complex reacted, in a period of about one day. It is desirable to extract as much of the third and last mole of $H_2$ (per mole of $NH_3BH_3$ pyrolyzed) as possible. Uncatalyzed thermolytic release of the third mole of hydrogen is known to require temperatures in excess of 500° C.

This invention thus overcomes the disadvantages of known techniques for dehydrogenation of ammonia borane (AB) complex by appropriate selection of dehydrogenation catalysts and solvents, which allow thermolysis or hydrolysis to proceed at comparatively low temperatures, such as 50-80° C. At the lower reaction temperatures provided by the invention, generation of undesirable volatile species that escape the reactor, that are commonly generated in significant concentrations in disclosed thermolytic systems is minimized. Because such temperatures are available by coupling the hydrogen generator to a PEMFC via a suitable heat exchanger, which transfers heat from the PEMFC to the hydrogen generator, the need for an auxiliary heating device can be eliminated. Alternatively, temperatures in the range of 50-80° C. can be achieved by combining surrounding and/or coupling (via a suitable heat exchanger) pyrolytic reactors with hydrolytic ones. Applied to $NH_3BH_3$, the invention thus lower the dehydrogenation temperature of $NH_3BH_3$, and allow release of more than two moles of hydrogen per mole of AB complex reacted.

The ammonia borane (AB) complex can be stored dry, mixed with water (slush), or dissolved in water. The catalyst can be added as a solid to the AB complex mixed (slush) or dissolved in water. The catalyst can also be dissolved in water and then added to dry AB complex, or slush/dissolved AB in water. Alternatively, the dry AB complex (or any amine borane complex for that matter) can be added directly to the cocktail that contains the catalyst dissolved in water. Furthermore, the catalyst can be added at once for faster dehydrogenation of or drop wise for the controlled hydrogen release from the amine borane complex (e.g. AB complex). Due to the high solubility of $NH_3$ in water, $H_2$ gas produced is high purity $H_2$ gas as defined herein. Boric acid also forms as a reaction product, based on XRD and NMR analysis.

There are expected to be many applications for the invention. In one embodiment, the invention is used to generate $H_2$, which is supplied to a hydrogen fuel cell, such as a PEMFC. FIG. 1 is the schematic of an exemplary electrical power source 100 comprising a hydrolytic hydrogen generator according to the invention 110 coupled to a PEMFC 160. A heat exchanger 145 receives heat generated by fuel cell 160 in the form of humidified oxidant (e.g. air). Heat exchanger 145 transfers heat from the PEMFC 160 to the hydrogen generator 110. As a result, system 100 does not require an auxiliary heating device to provide heat to drive the hydrogen generation reaction, such as a reaction temperature of 50 to 80° C.

Hydrogen generator 110 shown includes a first compartment 112 holding a catalyst comprising solution and a second compartment holding the ammonia borane 113, or other amine borane (AB) complex. Control electronics 118 is coupled to catalyst mass flow controller 119 and hydrogen mass flow controller 120. Catalyst mass flow controller 119 controls the flow of the catalyst solution, which enters second compartment 113 to achieve a desired hydrogen flow generated by hydrogen generator 110. Coupling connector 132 delivers hydrogen generated by hydrogen generator 110 to the anode of PEMFC 160.

In the embodiment shown in FIG. 1, the AB complex is stored in second compartment 113 as aqueous slurry (AB mixed with water). In operation, as soon as the hydrogen generator 110 is turned on, the control electronics 118 sends a signal to a mass flow controller (or a flow controller) 119 allows a predetermined flow rate of catalyst comprising "cocktail solution" to flow into the second compartment which holds the AB slurry. As a result, hydrogen gas in generated. Both the boric acid and ammonia reaction by-products are captured and remain in the second compartment 113. As noted above, although not shown in FIG. 1, in alternate embodiments the ammonia borane complex can be provided in dry form, or be in a dry state or as a slurry mixed with water or diglyme and pumped into a second compartment 113 holding the catalytic cocktail.

Hydrogen generators disclosed herein are capable of delivering PEMFC grade hydrogen gas by virtue of the low reaction temperature available, safely and reliably in an integrated and self-sustaining device that offers high specific energy storage density. Hydrogen PEM fuel cells are optimal for applications in the power range of 5-500 W where batteries and internal combustion engines do not deliver cost-effective and convenient power generation solutions. Unlike secondary batteries, the hydrogen generators disclosed here and formulations therein provide a constant source of power in a compact size that does not require electrical recharging.

System 100 shown in FIG. 1 and related systems can thus provide a viable solution to many military and civilian applications in need of a lightweight, highly dependable power source. Examples include, among others, auxiliary power units for small and remote applications, shelter power, emergency power, external power pack, battery charger, portable power for soldiers, unmanned aerial vehicles, and robotics.

EXAMPLES

It should be understood that the Examples described below are provided for illustrative purposes only and do not in any way define the scope of the invention. In all cases, AB (90% technical grade) was used as received from Aldrich Chemicals, Co. Examples 1-24 describe hydrogen generation via hydrolytic dehydrogenation of amine borne complexes, in general, and ammonia borane complex, in particular. Examples 25-30 describe thermolytic dehydrogenation of the ammonia borane complex. In most of the hydrolytic Examples provided, >80% hydrogen yield was obtained in <10 minutes. In certain Examples, >90% hydrogen yield was obtained in <5 minutes.

Example 1

To 0.1 g (3.2 mmol) of AB and 0.2 mL of water, 0.5 mL of 15.4 mM solution of $Cl_6K_2Pt$ was added at once. The flask was insulated with glass wool. Within 3 minutes, 205 mL of $H_2$ gas was collected.

Example 2

To 0.1 g (3.2 mmol) of AB, 0.5 mL of 15.4 mM solution of $Cl_6K_2Pt$ was added at once. The flask was insulated with glass wool. Within 10 minutes, 175 mL of $H_2$ gas was collected.

Example 3

To 0.1 g (3.2 mmol) of AB and 0.1 mL of water, 0.25 mL of 15.4 mM solution of $Cl_6K_2Pt$ was added at once. The flask was insulated with glass wool. Within 20 minutes, 185 mL of $H_2$ gas was collected.

Example 4

To 0.2 g (6.4 mmol) of AB and 0.2 mL of water, 0.5 mL of 19.6 mM solution (saturated) of $Cl_6K_2Pt$ was added at once. The flask was insulated with glass wool. Total of 410 mL of $H_2$ gas was collected. To the same flask, 0.1 g (3.2 mmol) of AB and 0.15 mL of saturated $Cl_6K_2Pt$ solution was added. Total of 185 mL $H_2$ gas was evolved. To the same flask, another 0.1 g of AB and 0.25 mL of saturated $Cl_6K_2Pt$ solution was added and total of 215 mL of $H_2$ gas was evolved. Another 0.1 g of AB and 0.2 mL of saturated $Cl_6K_2Pt$ solution was added to the same flask and 200 mL of $H_2$ was released.

Example 5

To 0.1 g (3.2 mmol) of AB and 0.1 mL of water, 0.20 ml of 22 mM solution of $Cl_6Na_2Pt$ was added at once. The flask was insulated with glass wool. Within 5 minutes, 210 mL of $H_2$ gas was collected.

Example 6

To 0.1 g (3.2 mmol) of AB and 0.1 mL of water, 0.25 mL of 20 mM solution of $H_2Cl_6Pt$ was added at once. The flask was insulated with glass wool. Within 7 minutes, 185 mL of $H_2$ gas was collected.

Example 7

Figure 2:
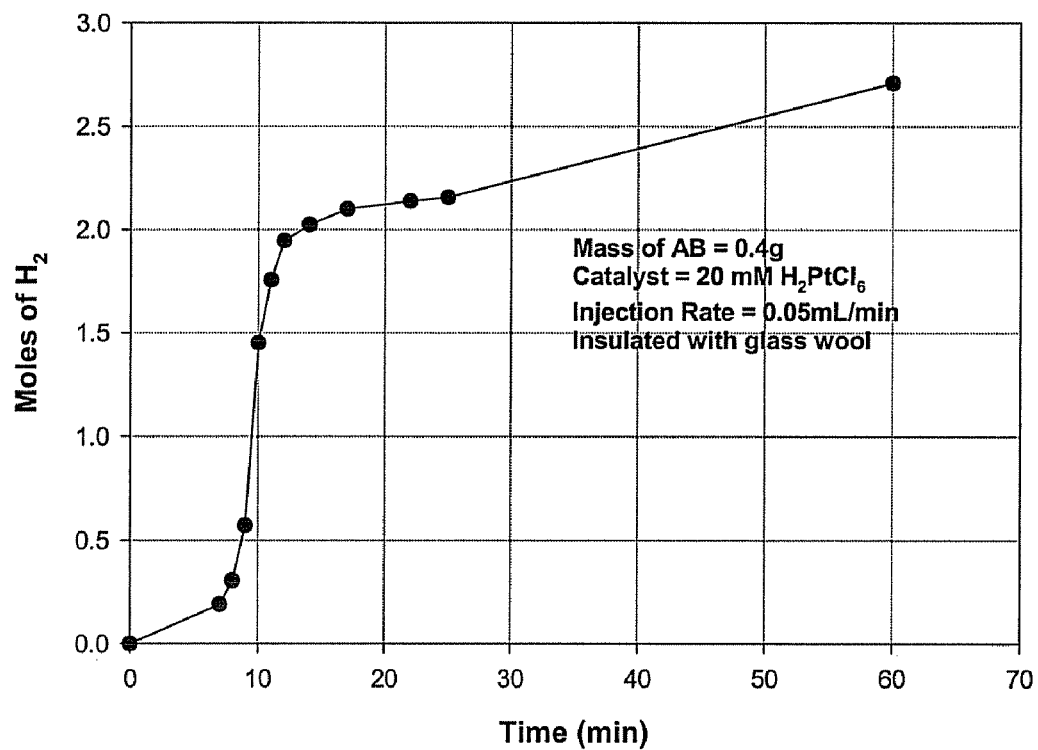
FIG. 2 shows the extent of hydrogen generated by mixing 0.4 g (12.8 mmol) of AB and 0.2 mL of water. 1.0 mL of a 20 mM solution of $H_2Cl_6Pt$ was added with an injection rate of 0.05 mL/min. The flask was insulated with glass wool.

To 0.4 g (12.8 mmol) of AB and 0.2 ml of water, 1.0 mL of 20 mM solution of $H_2Cl_6Pt$ was added with an injection rate of 0.05 mL/min. The flask was insulated with glass wool. Total of 710 mL of $H_2$ gas was collected. FIG. 2 shows the hydrogen generation results from this Example.

Example 8

Figure 3:
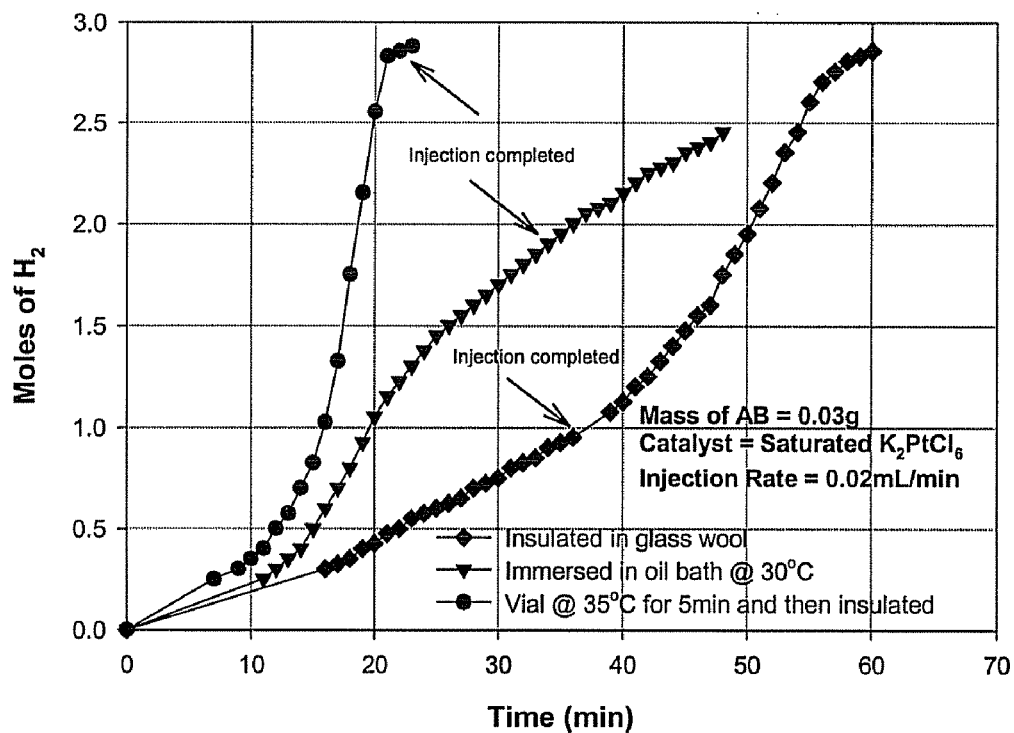
FIG. 3 shows the comparative hydrogen generation results obtained—for the insulated (with glass wool) isothermal (by immersion in an oil bath at 30° C.), and heated for the first 5 minutes at 35° C. reactor arrangements. To 0.3 g (12.8 mmol) of as received AB (90% technical grade) and 0.1 mL of water, 0.44 mL of saturated solution of $K_2Cl_6Pt$ was added using an injection pump set at 0.02 mL/min.

To 0.3 g (12.8 mmol) of as received AB (90% technical grade) and 0.1 mL of water, 0.75 mL of saturated solution of $K_2Cl_6Pt$ was added with an injection rate of 0.02 ml/min. The flask was insulated with glass wool. Total of 570 mL of $H_2$ gas was generated as shown in FIG. 3.

Example 9

To 0.3 g (12.8 mmol) of as received AB (90% technical grade) and 0.1 mL of water, 0.75 mL of saturated solution of $K_2Cl_6Pt$ was added with an injection rate of 0.02 mL/min. The flask was kept at 30° C. using an oil bath. Total amount of hydrogen gas generated was 580 mL—as shown in FIG. 3.

Example 10

To 0.3 g (12.8 mmol) of as received AB (90% technical grade) and 0.1 mL of water, 0.44 mL of saturated solution of $K_2Cl_6Pt$ was added with an injection rate of 0.02 mL/min. The flask was kept at 35° C. using an oil bath for the first 5 minutes and then was removed and insulated with glass wool. Total amount of hydrogen gas generated was of 575 ml—as shown in FIG. 3.

Example 11

To 0.1 g (3.2 mmol) of AB and 0.1 mL of water inside a Parr reactor, 0.25 mL of 19.6 mM solution of $Cl_6K_2Pt$ was added at once. Within 10 minutes, the pressure inside the reactor reached 26 psi and 180 mL of $H_2$ gas was collected.

Example 12

Figure 4:
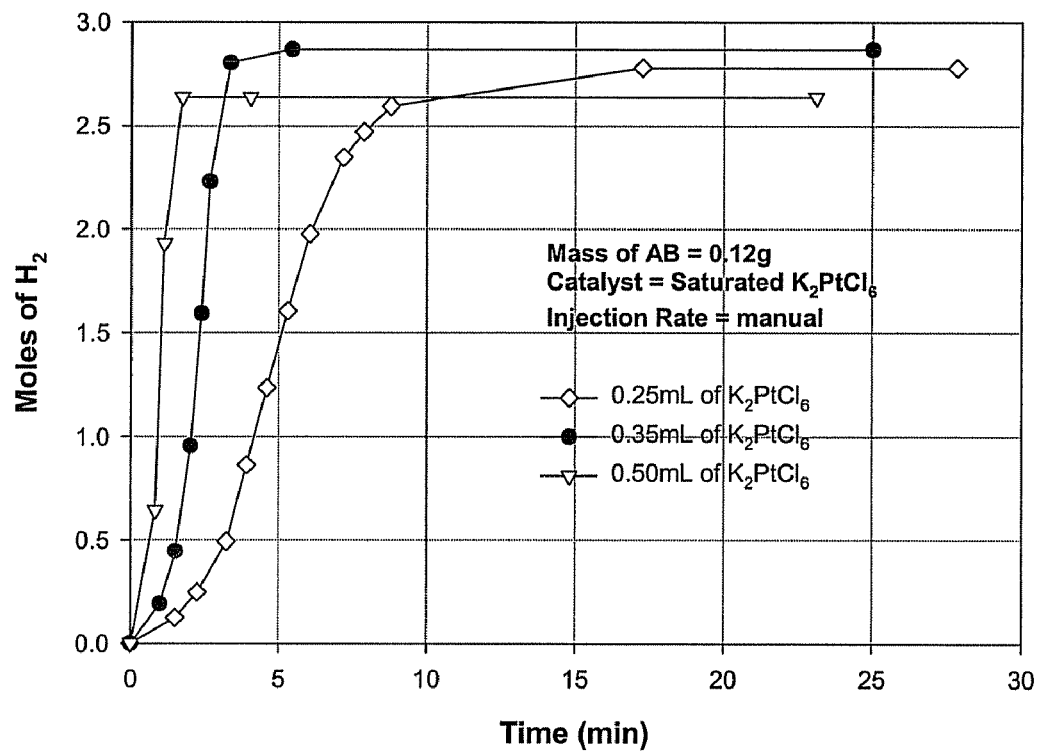
FIG. 4 shows the hydrogen generation results obtained using 0.12 g of AB with 0.25 mL, 0.35 mL, and 0.5 mL of 15.0 mM solutions of $Cl_6K_2Pt$ added at once.

To 0.12 g of AB, 0.25 mL, 0.35 mL, and 0.5 mL of 15.0 mM solution of $Cl_6K_2Pt$ was added at once and the rate of $H_2$ evolution was monitored. FIG. 4 shows the hydrogen generation results obtained. With 0.35 mL and 0.5 mL of catalyst solution, most of the hydrogen gas evolved in less than 3 minutes. When 0.25 mL of catalyst solution was used, 93% of hydrogen gas evolved in less than 9 minutes.

Example 13

Figure 5:
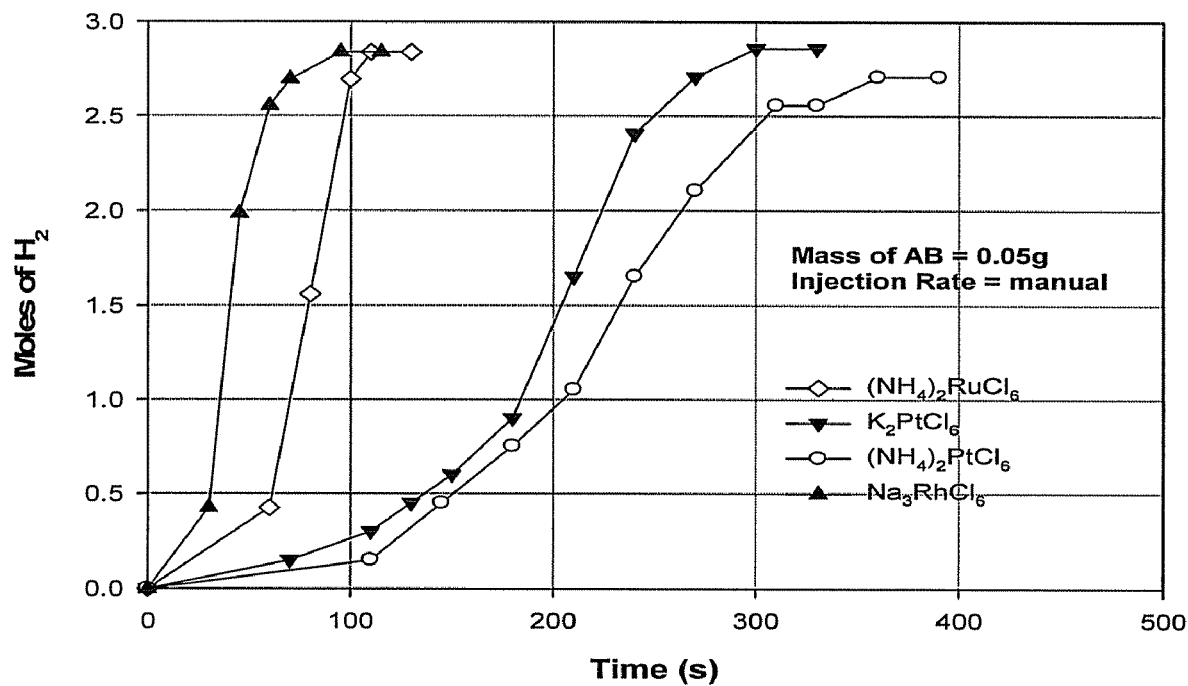
FIG. 5 shows the comparative hydrogen generation results obtained from the hydrolysis of AB complex using PGM catalysts such as $K_2PtCl_6$, $(NH_4)_2RuCl_6$, $Na_3RhCl_6$, and $(NH_4)_2PtCl_6$. Ruthenium and rhodium salts seen to be more active than platinum and rhodium salts.

A general procedure for the hydrolysis of AB complex using PGM catalysts such as $K_2PtCl_6$, $(NH_4)_2RuCl_6$, $Na_3RhCl_6$, and $(NH_4)_2PtCl_6$, is now described. To 0.05 g of AB complex, 0.1 mL of 19 mM solution of PGM catalyst was added and the amount of hydrogen evolved was recorded. FIG. 5 shows the hydrogen generation results obtained. Ruthenium and rhodium based catalysts were found to be the most active, followed by Pt.

Example 14

Figure 6:
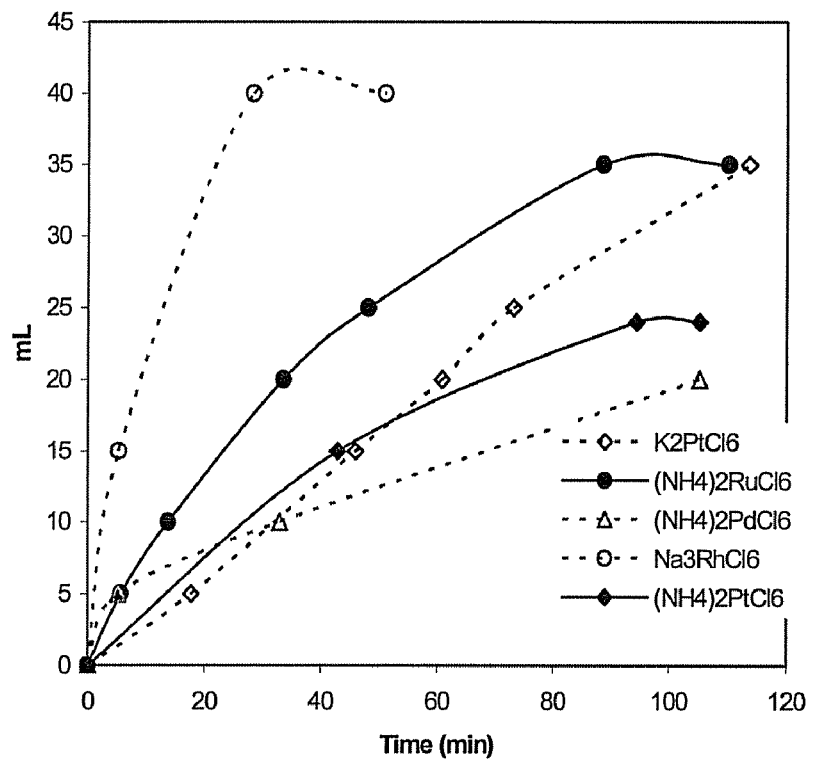
FIG. 6 shows the hydrogen generation results obtained from the hydrolysis of borane tertbutylamine complex using the PGM catalysts $K_2PtCl_6$, $(NH_4)_2RuCl_6$, $(NH_4)_2PdCl_6$, $Na_3RhCl_6$, and $(NH_4)_2PtCl_6$.

A general procedure for the hydrolysis of borane tertbutylamine complex using PGM catalysts such as $K_2PtCl_6$, $(NH_4)_2RuCl_6$, $(NH_4)_2PdCl_6$, $Na_3RhCl_6$, and $(NH_4)_2PtCl_6$ is now described. To 0.05 g of borane tertbutylamine complex, 0.1 mL of 19 mM solution of PGM catalyst was added and the amount of gas generated was monitored as a function of time. FIG. 6 shows the hydrogen generation results obtained.

Example 15

Figure 7:
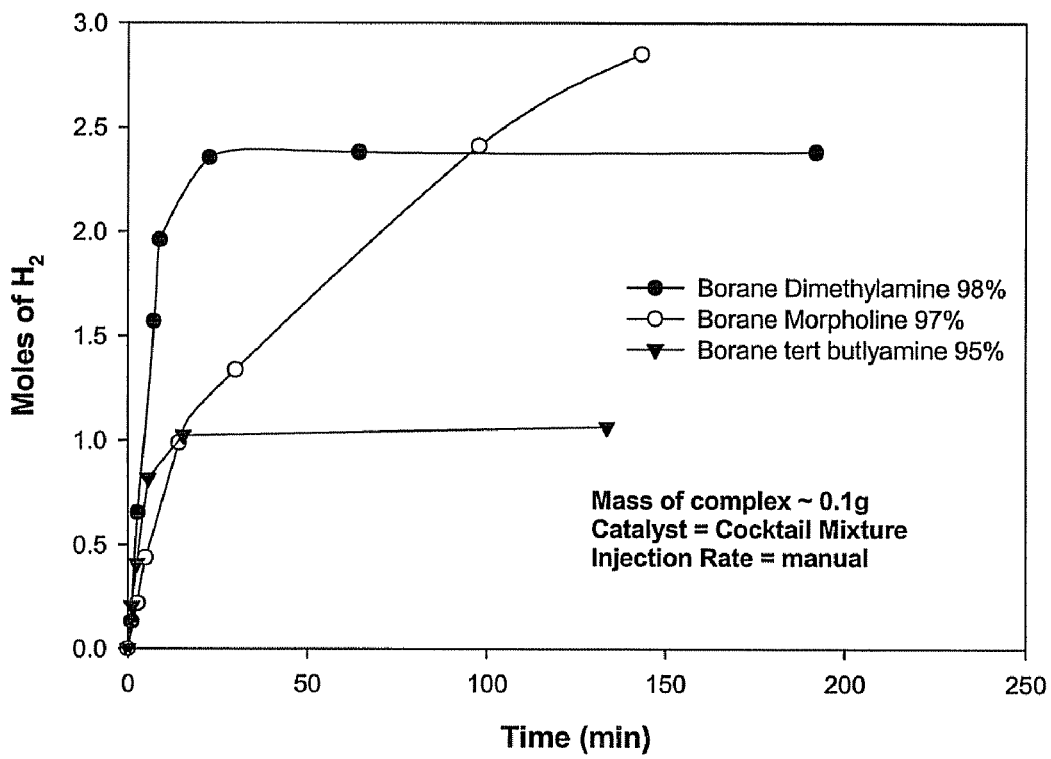
FIG. 7 shows hydrogen generation results obtained from mixing approximately 0.10 g of the amine borane complex, 0.34 g of a cocktail with the composition: 3.3 g $H_2O$, 2.5 g $H_3PO_4$ (85% by weight in water), and 0.025 g of a $Na_3RhCl_6$ catalyst, added at room temperature.

A general procedure for the hydrolysis of various amine borane complexes, such as, borane dimethylamine, borane morpholine, and borane tertbutylamine is now described. To approximately 0.10 g of the amine borane complex, 0.34 g of a mixture of the composition: 3.3 g $H_2O$, 2.5 g $H_3PO_4$ (85%), and 0.025 g $Na_3RhCl_6$ catalyst was added at room temperature and the amount of hydrogen produced was recorded as a function of time. FIG. 7 shows the hydrogen generation results obtained. The catalyst was most active toward borane dimethylamine and displayed moderate activity to other amine boranes.

Example 16

Figure 8:
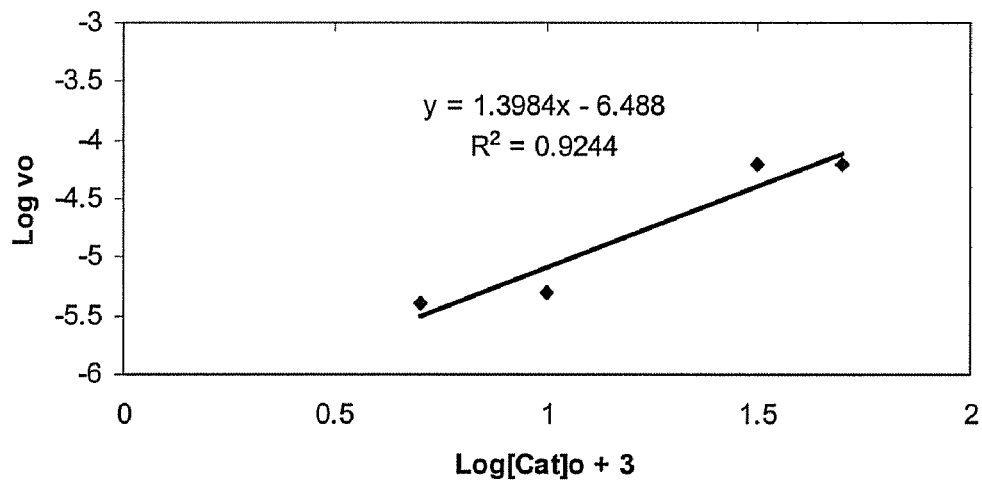
FIGS. 8 and 9 show kinetics of AB hydrolysis using $^{11}B$-NMR obtained by adding 0.01 g of AB to 7 mL of 5 mM, 10 mM, 30 mM, and 45 mM $K_2Cl_6Pt$ in $D_2O$ solution at 25° C., 30° C., and 35° C.
Figure 9:
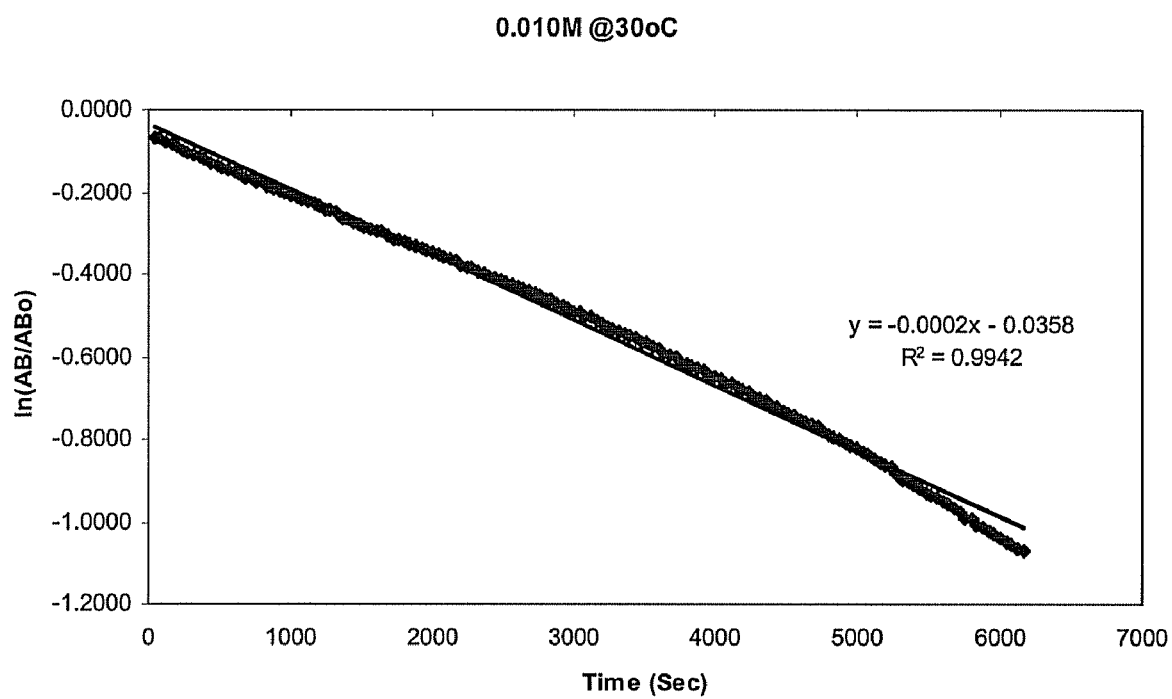

Hydrolysis kinetics of AB complex was investigated using $^{11}$B-NMR by adding 0.01 g of AB to 7 mL of 5 mM, 10 mM, 30 mM, and 45 mM $K_2Cl_6Pt$ in $D_2O$ solution at 25° C., 30° C., and 35° C. FIG. 8 shows the reaction order with respect to the catalyst data obtained. FIG. 9 shows the initial rate of AB hydrolysis using 10 mM $K_2Cl_6Pt$ catalyst solution at 30° C.: $v_o=k[Cat]^{1.4}[AB]$.

Example 17

Figure 10:
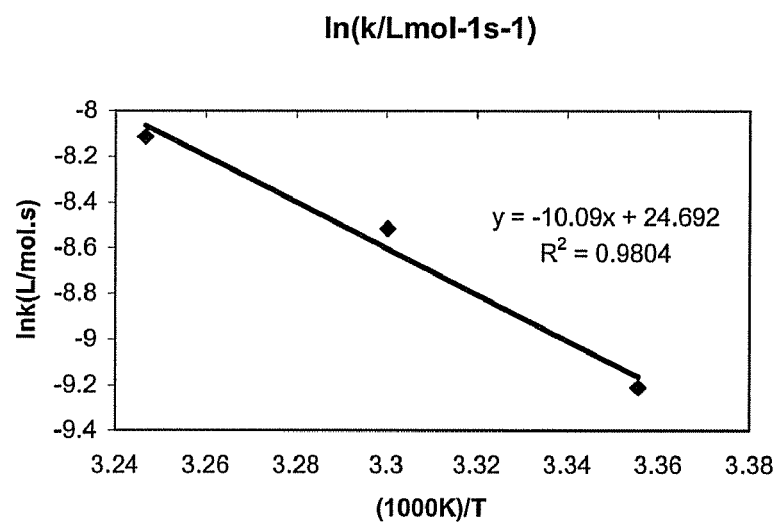
FIG. 10 shows the temperature dependence of the AB hydrolysis reaction rates given by the Arrhenius equation: $\ln k = \ln A - E_a/RT$, where, activation energy ($E_a$) is equal to: 83.9 kJ mol$^{-1}$ and pre-exponential factor (A) is equal to: $5.3 \times 10^{10}$ L mol$^{-1}$ s$^{-1}$.

FIG. 10 shows the temperature dependence of the AB hydrolysis reaction rates given by the Arrhenius equation. The temperature dependency of the AB hydrolysis reaction rates was determined to be given by the Arrhenius equation: ln k=ln A−$E_a$/RT, where, activation energy ($E_a$) is equal to: 83.9 kJ mol$^{-1}$ and pre-exponential factor (A) is equal to: 5.3×10$^{10}$ L mol$^{-1}$ s$^{-1}$.

Example 18

A special catalytic mixture (cocktail) was prepared in the following manner: 1.5 mL of concentrated $H_3PO_4$ was mixed with 3.3 mL of deionized water and 0.0221 g of $Na_3Cl_6Rh$–1 mL of cocktail weighed about 1.29 g. Several hydrolysis experiments were carried out using the cocktail of Example 18 as follows:

Example 19

0.5087 g of AB complex (Aldrich 90%) was placed in an insulated vial and 1.2890 g of $Na_3RhCl_6$-$H_3PO_4$ catalyst mixture (cocktail), prepared in Example 18, was added at room temperature using an injection pump at a rate of 0.025 mL/min. The amount of hydrogen evolution was recorded as a function of time.

Example 20

0.5129 g of AB complex (Aldrich 90%) was placed in a vial and kept at 70° C. oil bath. To the AB, 1.3081 g of cocktail ($Na_3RhCl_6$-$H_3PO_4$ catalyst mixture), prepared in Example 18, was added using an injection pump at a rate of 0.025 mL/min. The amount of hydrogen produced was recorded as a function of time.

Example 21

Figure 11:
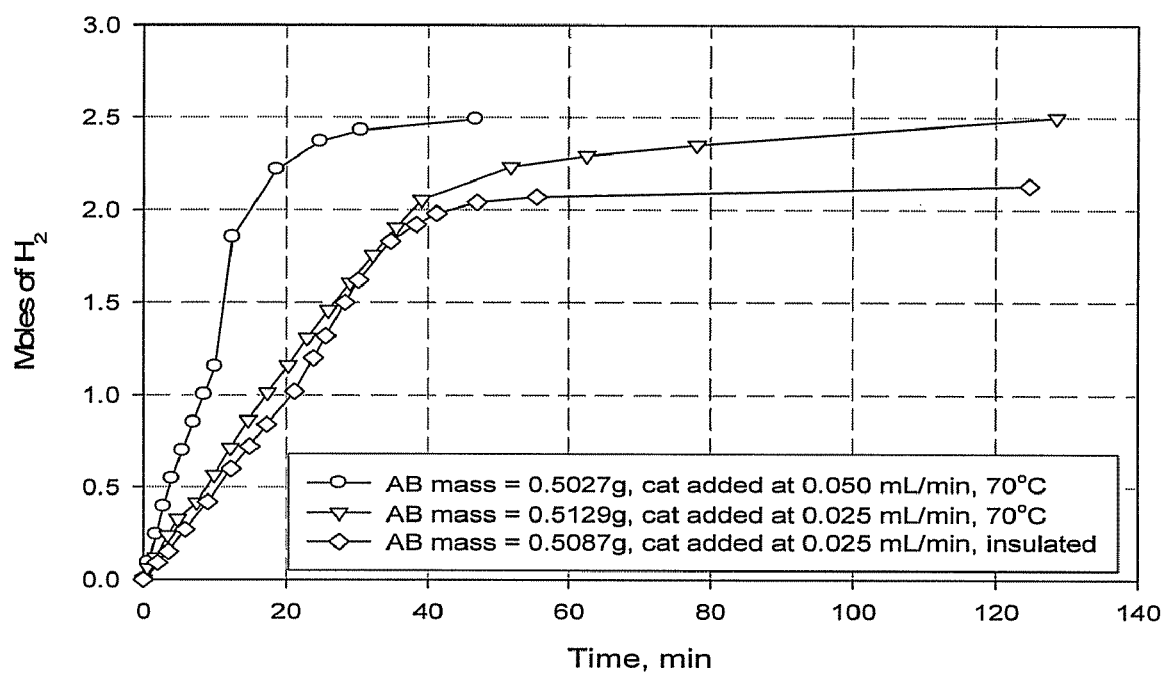
FIG. 11 shows the amount of hydrogen evolved as a function of time for data from catalyst cocktail injection rates 0.025 mL/min and 0.05 mL/min. 0.5028 g of AB complex (Aldrich 90%) was placed in an insulated vial and mixed with 1.2908 g of $Na_3RhCl_6$-$H_3PO_4$ catalytic cocktail.

0.5028 g of AB complex (Aldrich 90%) was placed in an insulated vial and 1.2908 g of $Na_3RhCl_6$-$H_3PO_4$ catalyst mixture, prepared in Example 18, was added at room temperature using an injection pump at a rate of 0.05 mL/min. The amount of hydrogen evolved was recorded as a function of time. FIG. 11 shows data for this Example along with data from Examples 19 and Example 20 (for both Examples 19 and 20; injection rate=0.025 mL/min).

Example 22

Figure 12:
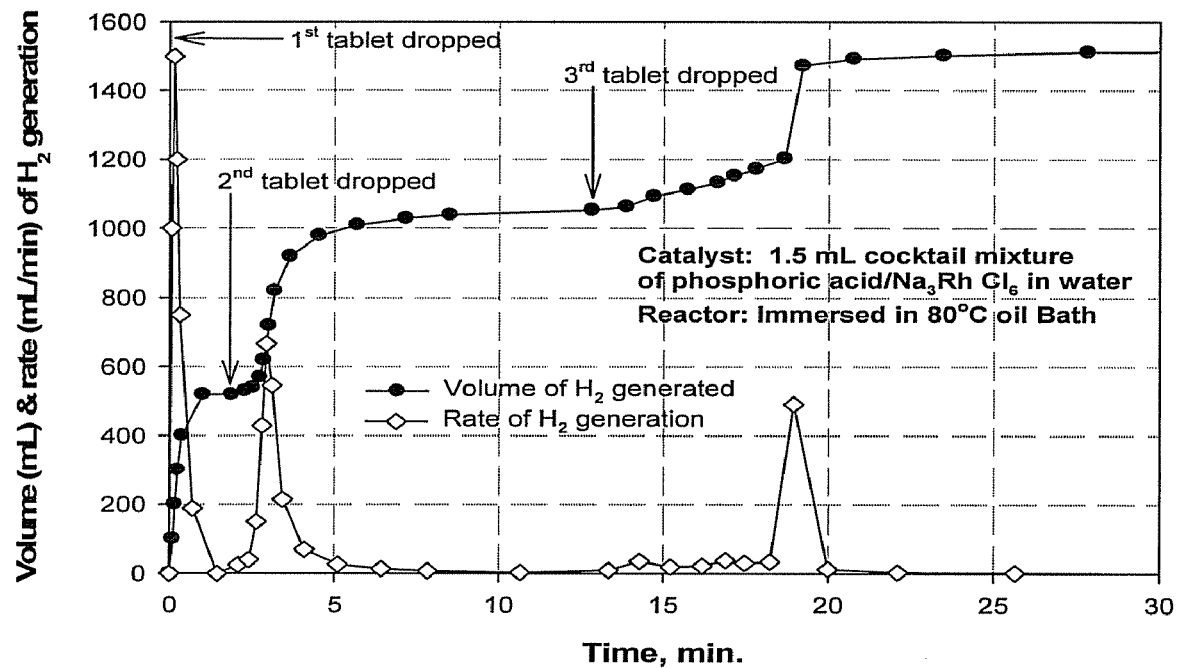
FIG. 12 shows the amount and rate of hydrogen generation as a function of time for the data obtained by dropping three tablets of AB complex (Aldrich 90%), one at a time, into an isothermal hydrolysis reactor kept at 80° C. in an oil bath. The reactor vial contained 1.5 mL of a catalytic cocktail mixture with following approximate composition: water/phosphoric acid/$Na_3RhCl_6$ salt=57.07/42.57/0.36 percent by weight.

Three tablets of AB complex (Aldrich 90%) weighing 0.24861 g, 0.25651 g, and 0.25485 g respectively were dropped, one at a time, into an AB hydrolysis reactor maintained at constant 80° C. in an oil bath. The reactor contained 1.5 mL of a catalytic cocktail mixture with following approximate composition: water/phosphoric acid/$Na_3RhCl_6$ salt=57.07/42.57/0.36 percent by weight. The amount and rate of gas generated was monitored as a function of time. FIG. 12 shows the hydrogen generation results obtained.

Example 23

A catalytic cocktail was prepared by completely dissolving 0.010 g of $Na_3RhCl_6$ into 3.8 mL of methanol. Then, 0.38 mL of this cocktail was sampled and added to 0.10 g of AB complex at 20° C. resulting in the evolution of 195 mL hydrogen gas within 4 minutes.

Example 24

The exemplary hydrolytic hydrogen generator 110 shown in FIG. 1 was configured and tested. For the purpose of this Example, design of the hydrogen generator was based on the following metrics: hydrogen flow rate of 340 standard mL/min corresponding to the PEMFC nominal power of 30 Watts (net)—this corresponds to about 30.6 mg/min of hydrogen (or 61.3 Watts of hydrogen, thermally, based on LHV of $H_2$; or a PEMFC efficiency of about 48.9%). The hydrogen stoichiometry for the hydrolysis of AB complex is as follows:

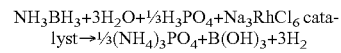

Ammonia borane (AB) complex reacts with a cocktail formed by-mixing water, phosphoric acid (an ammonia sequestering agent) and $Na_3RhCl_6$ salt (a catalyst) with the following composition: $H_2O$/$H_3PO_4$/$Na_3RhCl_6$=62.0%/37.6%/0.4% by weight. Density of the cocktail is about 1.34 g/mL. The stoichiometry above requires that approximately 2.1 mL (2.8 g) of cocktail should be added for each gram of AB complex reacted. In order to generate 340 standard mL/min of $H_2$, 0.469 g/min of AB should react with 0.985 mL/min (1.313 g/min) of cocktail solution.

As noted above, there are two basic methods for designing the hydrolytic hydrogen generator. In one embodiment, a given quantity of dry ammonia borane complex is placed within a holding tank/reservoir. Another tank holds the cocktail solution. As soon as the unit is turned on, the control electronics send a signal to a mass flow controller (or a flow controller) which then allows 1.313 g/min (or 0.985 mL/min) of cocktail solution to flow into the AB reservoir—resulting in the generation and release of 340 standard mL/min of hydrogen gas. Both the boric acid and ammonia will be sequestered and remain in the AB reservoir. Alternatively, the AB complex may be stored in a holding tank as an aqueous slurry (AB mixed with a suitable agent that does not promote dehydrogenation of the AB complex such as water (if the mixture always stored at low, near ambient temperatures), or compounds such as higher alcohols (e.g., 1-buthanol) instead of dry state. It is also possible that the cocktail solution is placed within a holding tank/reservoir and AB complex, in a dry state or as slurry or paste formed by mixing AB with water (if the mixture remains at near room temperatures) or with an auxiliary agent such as 1-buthanol, is pumped into the tank holding the catalytic cocktail. In this case, 0.469 g/min of AB complex needs to be added or pumped into the catalytic cocktail holding tank in order to generate 340 standard mL/min of high purity (greater than 99.99% by volume) hydrogen gas.

It is also possible to design the hydrogen generator in such a fashion so that pellets or tablets or pastes made with the AB complex are added to the catalytic cocktail mixture in order to generate high purity (greater than 99.99% by volume) hydrogen gas. As such, a device can be configured and designed so that it holds the AB complex introducing small portions of it (in the order of about 0.261 g) intermittently (i.e., one portion or tablet every minute in order to produce enough $H_2$ to operate a PEMFC and generate 30 W of electrical power) into a reservoir or tank holding catalytic cocktail mixture prepared by the method of Example 18 in a manner similar to that described in the Example 22.

Examples 25-30 below describe hydrogen generation via thermolytic dehydrogenation of ammonia borane complex. Examples 25 (no solvent and no catalyst) and 26 (no catalyst) are controls.

Example 25

0.206 g quantity of $NH_3BH_3$ (Aldrich 90% Technical grade) was weighed into a 10 mL glass vial that was attached to polyethylene tubing containing a syringe sample port and a water displacement system for quantitatively measuring the amount of $H_2$ produced. The vial was immersed in a 70° C. oil bath. No hydrogen gas was generated even after five days.

Example 26

0.210 g of $NH_3BH_3$ was weighed into a 10 mL glass vial and 0.4-mL of iso-octane added. The mixture was reacted as in Example 25. After 23 hours at 70° C., 92 mL of hydrogen (0.67 moles) was collected.

Example 27

Figure 13:
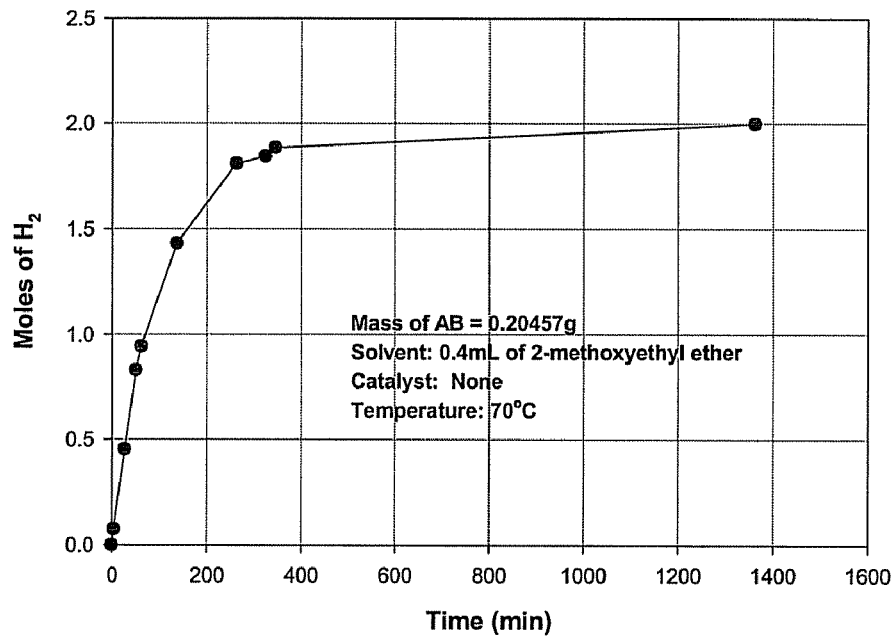
FIG. 13 shows the amount of thermolytic hydrogen generation as a function of time for the data obtained by placing 0.205 g of $NH_3BH_3$ (Aldrich 90%) inside a 10 mL glass vial reactor containing 0.4 mL of 2-methoxyethyl ether at 70° C.

0.205 g of $NH_3BH_3$ was weighed into a 10 mL glass vial and 0.4 mL of 2-methoxyethyl ether added. The mixture was reacted as in Example 25. After 23 hours at 70° C., 265 mL of hydrogen (2.0 moles) was collected as shown in FIG. 13.

Example 28

Figure 14:
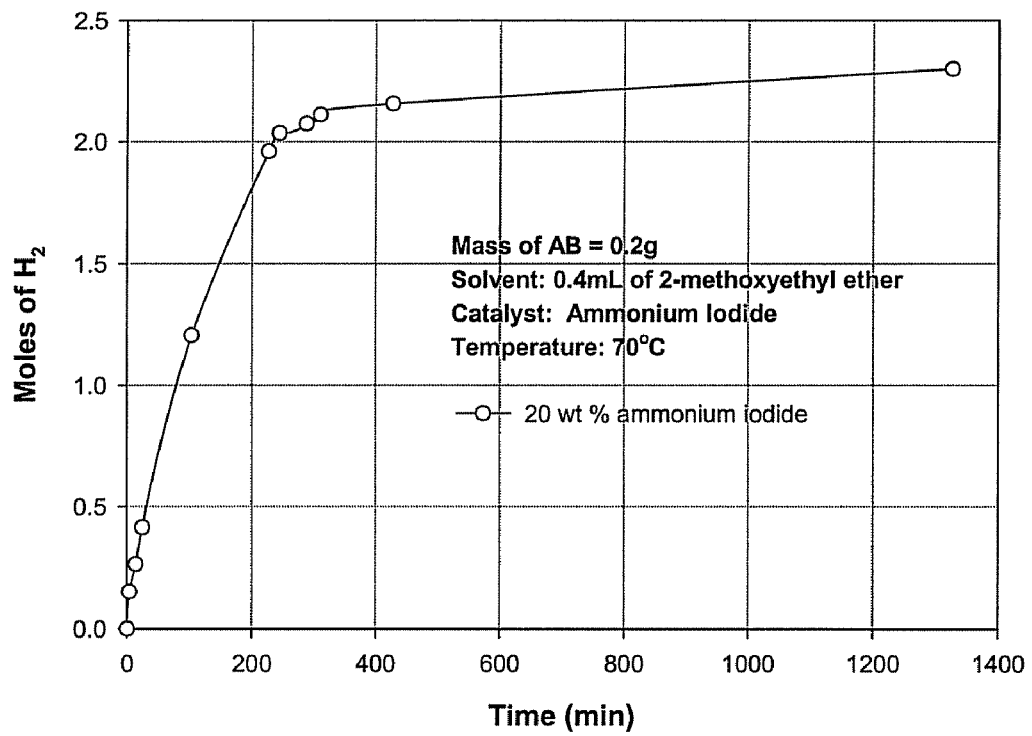
FIG. 14 shows the amount of thermolytic hydrogen generation as a function of time for the data obtained by placing 0.204 g of $NH_3BH_3$ (Aldrich 90%) inside a 10 mL glass vial reactor containing 0.4 mL of 2-methoxyethyl ether and 0.0405 g $NH_4I$ at 70° C.

0.204 g of $NH_3BH_3$ was weighed into a 10 mL glass vial and 0.4 mL of 2-methoxyethyl ether, and 0.0405 g $NH_4I$ added. The mixture was reacted as in Example 25. After 22 hours at 70° C., 305 mL (2.3 moles) of hydrogen was collected—as shown in FIG. 14.

Example 29

Figure 15:
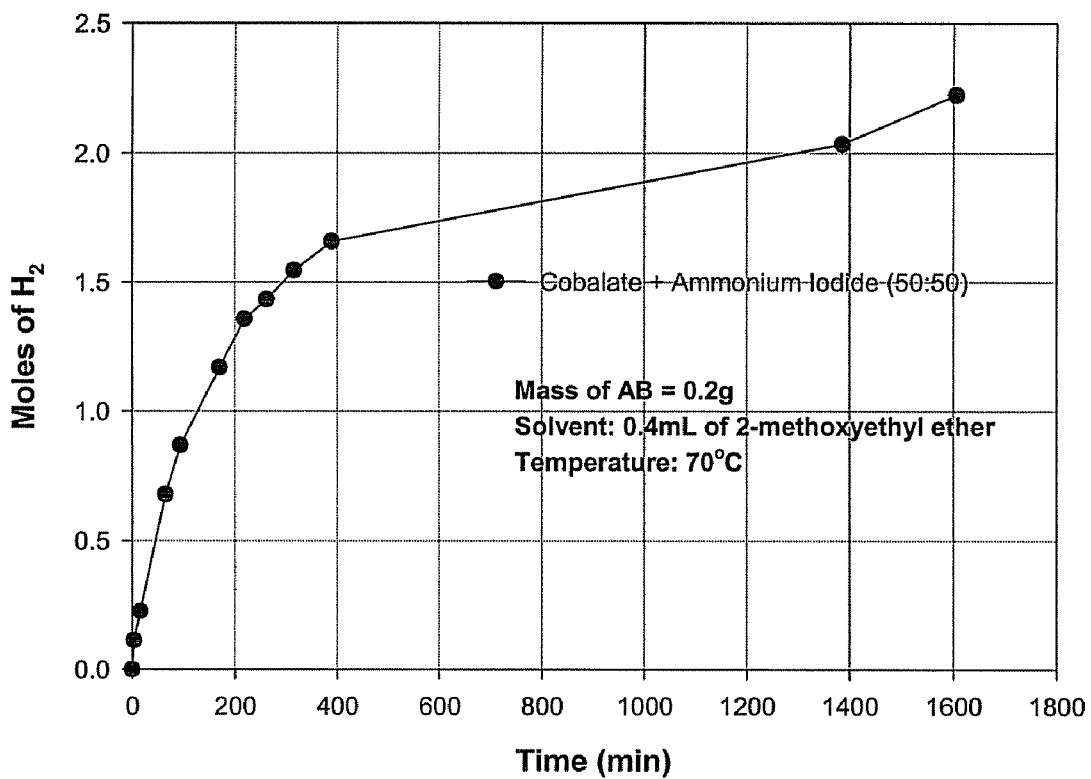
FIG. 15 shows the amount of thermolytic hydrogen generation as a function of time for the data obtained by placing 0.203 g of $NH_3BH_3$ (Aldrich 90%) inside a 10 mL glass vial reactor containing 0.4 mL of 2-methoxyethyl ether, 0.0065 g $K_3Co(CN)_6$, and 0.0074 g $NH_4I$ at 70° C.

0.203 g of $NH_3BH_3$ was weighed into a 10 mL glass vial and 0.4 mL of 2-methoxyethyl ether, 0.0065 g $K_3Co(CN)_6$, and 0.0074 g $NH_4I$ added. The mixture was reacted as in Example 25. After 26 hours at 70° C., 295 ml (2.2 moles) of $H_2$ gas was collected as shown in FIG. 15.

Example 30

0.204 g of $NH_3BH_3$ was weighed into a 10 mL glass vial and 0.4 mL of 2-methoxyethyl ether, 0.042 g of $NH_4I$, 0.0029 g of di-μ-chlorobis(p-cymene)chlororuthenium (II) added. The mixture was reacted as in Example 25. After 19 hours of run at 70° C., 295 mL (2.2 moles) of hydrogen gas was produced.

It is to be understood that while the invention has been described in conjunction with the preferred specific embodiments thereof, that the foregoing description as well as the examples, which follow, are intended to illustrate and not limit the scope of the invention. Other aspects, advantages and modifications within the scope of the invention will be apparent to those skilled in the art to which the invention pertains.

The invention claimed is:

1. A thermolytic method of generating hydrogen, comprising the steps of:
    providing an amine borane (AB) complex, at least one hydrogen generation catalyst comprising a transition metal complex or a salt, and an at least weakly coordinating non-hydroxyl comprising solvent, and
    mixing said AB complex, said hydrogen generation catalyst and said at least weakly coordinating non-hydroxyl comprising solvent to result in a thermolytic dehydrogenation reaction of said AB complex that generates hydrogen gas.

2. The method of claim 1, wherein said hydrogen gas produced by said mixing step exclusive of any separation processing comprises at least 99% by volume hydrogen.

3. The method of claim 1, wherein said method is performed in a temperature range between 20° C. and 120° C.

4. The method of claim 3, wherein said method is performed in a temperature range of between 25° C. and 80° C.

5. The method of claim 1, wherein said hydrogen generation catalyst comprises a transition metal complex.

6. The method of claim 5, wherein said transition metal complex hydrogen generation catalyst is at least one selected from the group consisting of cobalt complexes, noble metal complexes and metallocenes.

7. The method of claim 5, wherein said transition metal complex hydrogen generation catalyst is at least one selected from the group consisting of $K_3Co(CN)_6$ and di-μ-chlorobis (p-cymene)chlororutheniumn (II).

8. The method of claim 1, wherein said AB complex comprises $NH_3BH_3$.

9. The method of claim 1, wherein said at least weakly coordinating non-hydroxyl comprising solvent is selected from the group consisting of mono, di, tri, and tetraglyme, tetrahydrofuran, dimethylformamide, 1-Methyl-2-Pyrrolidinone, crown ethers and ethylenediamine.

10. The method of claim 9, wherein said at least weakly coordinating non-hydroxyl comprising solvent comprises diglyme (2-methoxyethyl ether).

11. The method of claim 1, wherein said hydrogen generation catalyst comprises a salt.

12. The method of claim 11, wherein said salt comprises a salt of a weak base and a strong acid.

13. The method of claim 11, wherein said salt is selected from the group consisting of $NH_4I$, $NH_4Br$ and $NH_4Cl$.

14. The method of claim 1, wherein a yield of said hydrogen gas is at least 2 moles per mole of said AB complex.

15. The method of claim 1, wherein said method is performed exclusive of a support for said AB complex.

16. A thermolytic method of generating hydrogen, comprising the steps of:
    providing an amine borane (AB) complex, at least one hydrogen generation catalyst comprising a transition metal complex or a salt, and an at least weakly coordinating solvent, and mixing said AB complex, said hydrogen generation catalyst and said at least weakly coordinating solvent to result in a thermolytic dehydrogenation reaction of said AB complex that generates hydrogen gas, wherein said at least weakly coordinating solvent does not participate as a reactant in said thermolytic dehydrogenation reaction, wherein said thermolytic dehydrogenation reaction is performed in a temperature range between 25° C. and 80° C. and at least 2 moles of said hydrogen gas is generated per mole of said AB complex.

17. The method of claim 16, wherein said hydrogen generation catalyst comprises a salt.

18. The method of claim 17, wherein said salt is selected from the group consisting of $NH_4I$, $NH_4Br$ and $NH_4Cl$.

19. The method of claim 16, wherein said amine borane complex comprises $NH_3BH_3$.

20. The method of claim 16, wherein said at least weakly coordinating non-hydroxyl comprising solvent is selected from the group consisting of mono, di, tri, and tetraglyme, tetrahydrofuran, dimethylformamide, 1-Methyl-2-Pyrrolidinone, crown ethers and ethylenediamine.

* * * * *